Aug. 8, 1967 J. D. RIESER 3,334,727
UNISHAFT TROUGHING IDLER
Filed Sept. 9, 1964 2 Sheets-Sheet 1

INVENTOR.
BY John D. Rieser

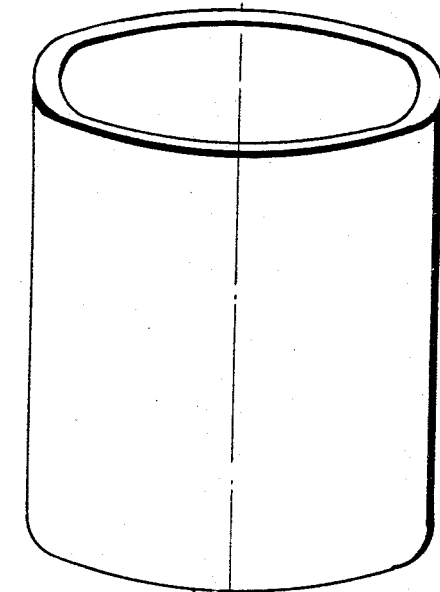
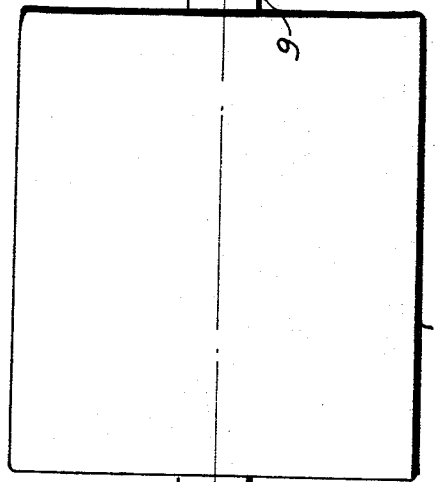
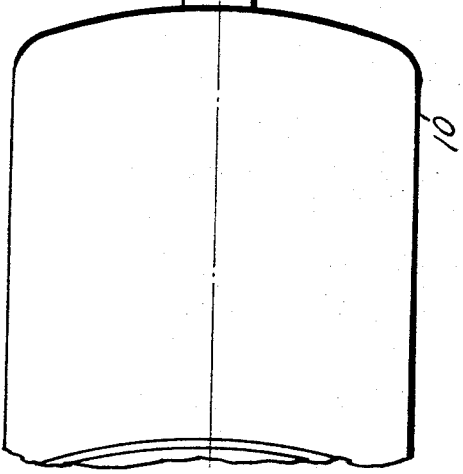
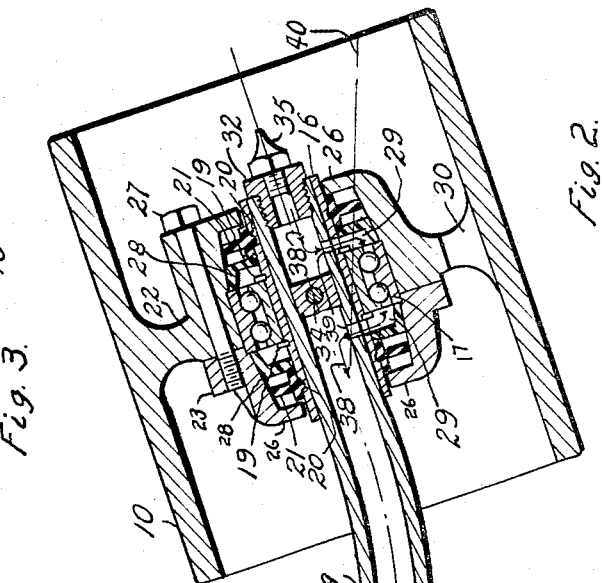
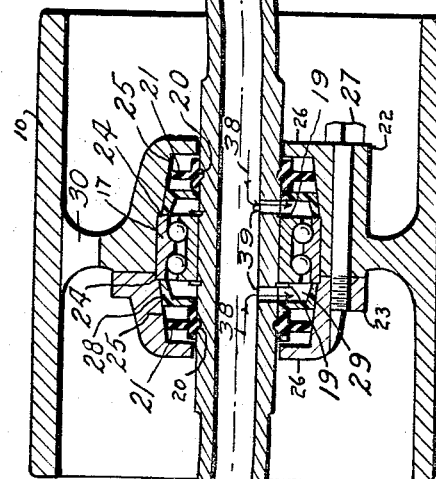
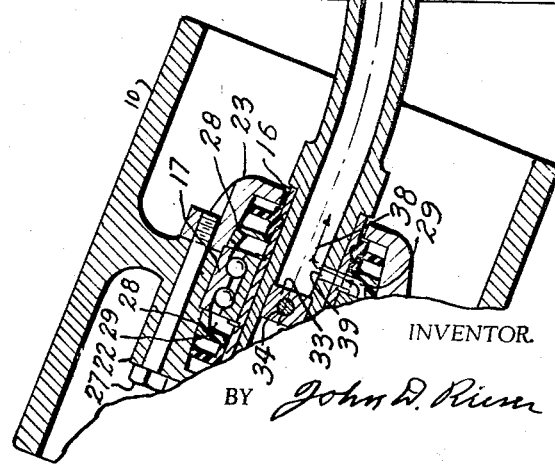

United States Patent Office 3,334,727
Patented Aug. 8, 1967

3,334,727
UNISHAFT TROUGHING IDLER
John D. Rieser, 693 Mission St.,
San Francisco, Calif. 94105
Filed Sept. 9, 1964, Ser. No. 395,176
2 Claims. (Cl. 198—192)

This invention relates to a unishaft troughing idler having a multiplicity of rolls arranged in-line and equipped with anti-friction bearing means, wherein the axis of a portion of the rolls extend in a horizontal direction while the axes of the other rolls extend at an angle relative to the horizontal, so that in a belted conveyor system causes the carrying side of an endless conveyor belt to form a trough for conveying bulk commodities.

An object of the present invention is to provide a self-contained troughing idler having a single shaft section arranged to support anti-friction bearing means for a multiplicity of rolls, of which a portion of the rolls having their axis extending horizontally while others having their axes extending upwardly at an angle relative to the horizontal, so that the top faces of the rolls produce a trough shape for a conveyor belt.

Another object of the present invention is to provide a self-contained troughing idler as above wherein the anti-friction bearing means at each roll have preloaded properties and thereby prevent any tilting of the respective roll journally supported thereby.

Another object of the present invention is to provide a self-contained troughing idler as the proceeding wherein the single shaft section being of tubular form.

Another object of the present invention is to provide a self-contained troughing idler as above wherein the tubular shaft provides the prime lubricant passage by having apertures extending through its wall in adjacency to the ends of the anti-friction bearing means of the rolls and thereby provide passages for delivery thereto of the lubricant from the prime lubricant passage.

Another object of the present invention is to provide a self-contained troughing idler as above wherein the prime lubricant passage having at each of the inclined rolls a plug disposed intermediate a pair of the apertures that extend through a wall of the tubular shaft.

Another object of the present invention is to provide a self-contained troughing idler as the preceding wherein wherein each roll having a hub and a cap and both having a cylindrical bore portion of a combined length to match the outer race of the respective anti-friction bearing means and beyond this cylindrical bore each having a taper bore sloped to cause an end of a seal member abutting tightly the end faces of said outer race, so that these seal members rotate with the rotation of the roll. And thereby form a seal for the lubricant upon the hub and cap being suitably fastened together.

Other more specific objects and advantages will appear from the following description of the illustrations embodiment of the present invention.

In the drawings accompanying and forming a part hereof.

FIGURE 2 is an enlarged sectional side view similar to that of FIGURE 1, of the roll and shaft sub-assembly apart from the base.

FIGURE 3 is a top plan view of the FIGURE 2, to show the in-line arrangement of the rolls.

Figure 4:
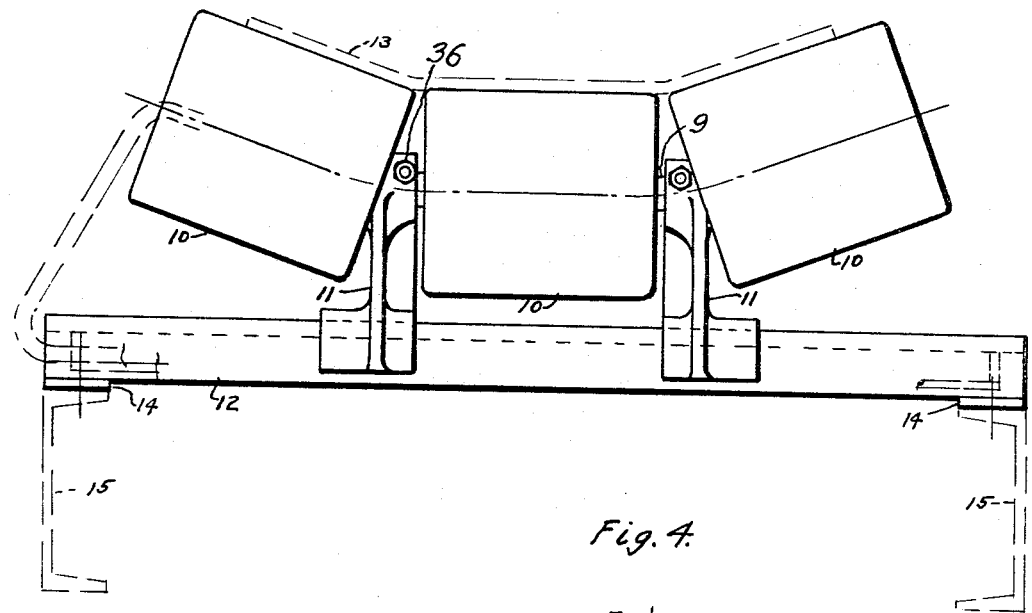
FIGURE 4 is an external side view similar to that of the FIGURE 1, indicating by means of dash lines, the base pad resting on the top face of a pair of conveyor stringers. Also indicating by means of dash lines an optional inclusion of a lubrication pipe, so as to permit of all lubrications being performed at one side of the conveyor system.

In the field of conveying free flowing bulk commodities of solid form by means of belt conveyor systems employing a flexible flat type belt, to increase capacity of a given belt it is an established practice to support the carrying belt strand of the belt by means of troughing idlers, regularly spaced intermediate the head (discharge) and tail (feed end) pulleys. Which troughing idlers causes the cross-width of the belt to form a trough shape, and thereby without danger of spillages, materially increase the cubic bulk of the load per foot of the belt.

Heretofore prior self-contained troughing idlers having a series of rolls in-line have been provided, however all the major designs involve an excess number of elements or features, for instance (1) each roll of their series requires an individual shaft element, and as a consequence (2) requires two anti-friction bearing elements at each of their series of rolls, which unavoidably requires (3) two support elements at each individual shaft consequently (4) to provide of a relubrication feature requires at least an individual lubrication system leading to each roll, which unavoidably produces the objectionable (5) the feature of over lubrication at the lower disposed anti-friction bearing element at all the inclined rolls, or (6) under lubrication of the anti-friction bearing element disposed at the upper portion of all the inclined rolls, and an additional feature (7) to avoid of lubricant leaking out of their grease reservoir, they must resort to using a hard grease, not particularly desirable in the field of lubricating anti-friction type bearing elements, as it unavoidable causes a material amount of drag resistance at each roll element, hence consuming costly power, excessive belt and roll wear (8) all of which obviously results in excess cost factors.

As will be seen, the present invention concerning my self-contained troughing idler, in no way entail any of the aforementioned inherent excess number of elements and features, pertaining particularly to the prior major lines of troughing idlers.

Referring to the FIGURES 1, 2, 4 and 5, showing side and end views of my self-contained unishaft troughing idler with three rolls, of which the axis of the center roll extends horizontally, however it can be designed to provide for greater number of rolls to accommodate wide section conveyor belts. Generally the troughing idler consists of the single shaft section 9, the three rolls 10, the two support brackets 11 and the base member 12, all hereinafter described. And of the FIGURE 4, the numeral 13 represents by means of dash lines the carrying strand of a conveyor belt resting on the top face of the three rolls 10, to show the trough shape caused by the respective position of the individual rolls. Also at this figure show the end base pad 14 of the base 12 resting on the top face of the spaced pair of conveyor stringers 15, of a conveyor system. In practice these base pads 14 are suitably bolted thereto each of the stringers 15, of which the gauge distance between a pair of stringers 15 is a well established standard.

Figure 1:
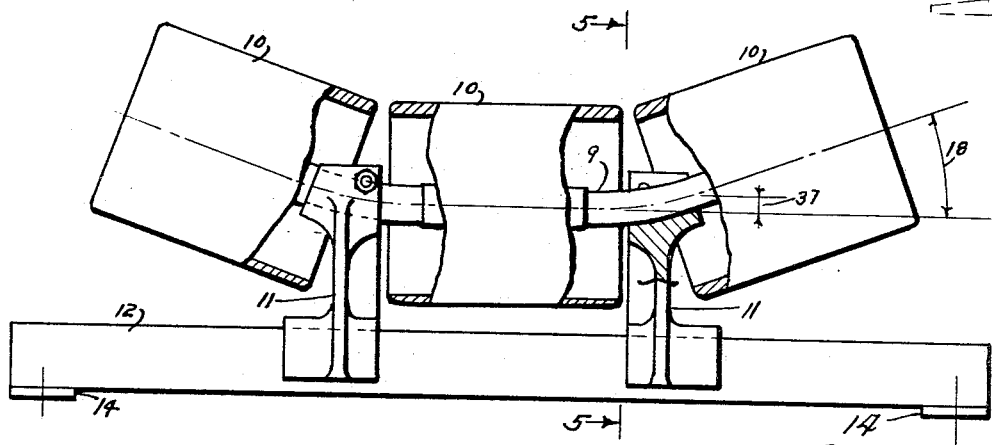
FIGURE 1 is a side view in free position of my self-contained unishaft troughing idler, parts broken away and in section to show support of the shaft and roll sub-assembly, taken on the line 1—1 of FIGURE 5.
Figure 5:
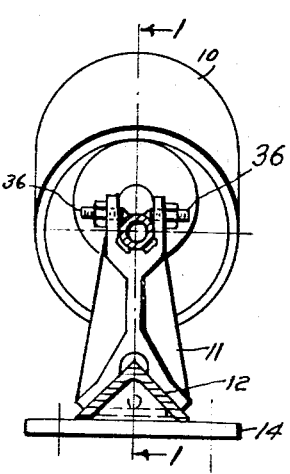
FIGURE 5 is an end view partly in section, taken on the line 5—5 of FIGURE 1.

The FIGURES 1 and 2, show the shaft 9 as being a single length of tubing or the like and formed to support all three of the rolls 10. However, before bending upwardly the end portions of this shaft 9, the end portions are machined to provide a fit for the bushings 16 (best seen at the enlarged FIGURE 2). These machinings may be extended to include the horizontal disposed roll 10, for an inclusion of a bushing 16 at this roll. However, have elected to show this horizontal portion of the shaft machined to a size equal to that of the outside diameter of the bushings. And thereby provide of all the anti-friction bearings 17 being of same size, instead of having the larger bearing at the horizontal roll and smaller size bearings at both end portions mounted directly onto the machined shaft, in place of being as shown on the bushing member. The purpose, having the horizontally disposed bearing of larger size, than that of the shaft end portions, is for assembly purposes, hereinafter described. Upon completion of machining operations the shaft be bent so that both end portions extend upwardly at a desired angle as represented by the arrowed curve 18. To hold in place, each of these bearings 17 is by the provision of the snap rings 19, within their spaced pair of grooves that are machined in both the shaft and the bushings. Also machined in both the shaft and the bushings are a pair of curved grooves 20 spaced outwardly from the snap ring grooves, for the stationary seal members 21. These stationary seal members 21 being molded of oil resisting elastic rubber compound (such as neoprene) and having a flange and hub portions with apertures to fit snugly the outside diameters of the shaft and bushings and their curved grooves, which grooves are to hold these stationary seal members in their respective positions.

As shown the rolls 10 have a cyclindrical length of equal amount, however they may be made differently if desired. Internally each roll has a hub 22 and a cap 23, both of which have cylindrical bore of size to match the external diameter and length of the outer race of the anti-friction bearing applied, so that the ends of same abut the shoulders 24. And beyond the ends of each cyclindrical bore, both the hub and cap having a taper bore 25, which terminates at the inner face of the wall 26, which are in turn bored slightly larger than the outer diameter of both the shaft and bushings, so that upon the hub and cap being suitably fastened together, as by a series of screws 27 (only one at each roll being shown in the FIGURE 2) and thereby provide a closure for the anti-friction bearing means and both the stationary and rotary seal members. The rotary seal members 28 being of a plastic oil resistant material or rubber compound and having an outer rim portion of taper form to tightly match the taper 25, so that upon the hub and cap being suitably fastened together cause an end of the rim portion to abut the end portion of the outer race of the anti-friction bearing and form a grease pocket 29 at each end of the bearings 17. The tightly matched fit between the taper bore 25 and the outer rim portion of the rotary seal members 28, also causes these seal members 28 to rotate with the roll and the outer race of the bearings 17 in each case, which advantageously provides a grease seal without involving any rubbing surfaces at these points, for the bore of the web portion of the rotary seal members are a neat slip fit onto the outer diameter of both the shaft and bushings. And to provide a seal at these bores provide a pressure sealing contact between the inner end of the hub of the stationary seal member 21 and the face of the web of these rotary seal members 28.

Of the rolls 10, between the rim and the hub are a series of cored holes 30 to allow water or the like to pass therethrough.

The anti-friction bearings 17 are of the standard preloaded type, involving inner and outer races with axially spaced grooves formed for a dual series of anti-friction roller members suitable interposed between the races to resist misalignment and to avert of any tilting action between the two, or a tilting action of the rolls 10. The foregoing structural features of the bearing assembly 17 are well understood by those skilled in the art and need not be further described in detail whether an individual or dual bearings are applied.

Now let it be assumed that it is desirable to assemble the center roll into position on the shaft 9, after its having been bent. First the cap 23 is slipped on from the right end of the shaft, which is followed by the left stationary seal member 21, then the left rotary seal member 28, then the left snap ring 19 is inserted, and followed by the anti-friction bearing 17, and then the right snap ring 19, which fixes the position of the bearing, then in proper rotation the right rotary and stationary seal members are slipped into position, whereupon the roll 10 is slipped on and drawn onto the outer race of the bearing by means of a pair of long threaded screws which draws the roll hub and cap to abut one another, whereupon the regular series of screws 27 are included, and locked in place by wire means (not shown). All of which fixes the location of this centrally disposed roll.

The foregoing described assembly of the horizontally disposed roll being perfectly feasable, as the size of the bearing aperture being of sufficient size to permit having an aperture within the respective parts correspondingly sized so that all these parts readily pass over the curve of bent portion of the shaft 9.

Internally both ends of the shaft 9 are drilled pipe tap size to a depth to position the plug 33 at approximately the mid length of the bearing 17, which is then anchored in place by the pin 34, which pin also hold the sleeve in position after they have been assembled onto the shaft. Both ends of the shaft being pipe tapped for the pipe bushing 32, which in turn is threaded for the grease fitting 35, whose purpose along with that of the plugs 33 are hereinafter described.

The assembly of both the inclined rolls on to the shaft 9 are performed in a similar manner. And having completed assembly of the three roll 10 onto the single shaft 9, conveniently provides a sub-assembly that can be readily dropped into the slots provided at the upper end of the pair of bracket members 11. Which slots having a bore and width to match the radius of the bends at the shaft 9. And to prevent of same falling out provide a pair of setscrews 36 at each side of the slots in manner so that screwing in of these setscrews cause a seating of the shaft into the slots, best seen at the FIGURE 5. And when seated the arrowed distance 37 of the hold within the slots locks the sub-assembly in an upright position. The lower end of these brackets 11 are provided with flange means for suitably fastening same onto the base 12 (the fastenings are not shown). The base 12 may be a structural member of any desired contour, that shown is a structural angle in an inverted position and at both ends include the base pads 14 heretofore mentioned.

Now assuming that this self-contained unishaft troughing idler has been installed onto a pair of conveyor stringers and that it is desired to perform a lubrication cycle. And as mentioned each end of the shaft 9 is equipped with a grease fitting 35, from which the grease follows the arrowed lubricant path 38, as the plug 33 causes the lubricant to pass through the aperture 39 into the space pocket 29 then through the bearing into the opposite space pocket 29, then upwardly through the oppositely disposed aperture 39 back into the tubular shaft (best seen at the FIGURE 2) to the aperture 39 at the horizontally disposed roll, where it drops into the space pocket 29 at this bearing. As described all of these space pockets 29 having been formed by the rotary seal members 28 at both sides of the bearings 17. And of which the apertures 39 at each bearing are a pair of holes drilled through a shaft wall in line with these apertures space pocket 29.

All of which provide a lubrication system wherein all of the anti-friction bearing means at the inclined and the horizontally disposed rolls can readily be provided with lubricant of a suitable grade, without causing over or under greasing conditions. For the very reason that at each roll the space pockets 29 provide individual grease retention situations that are independent of one another, hence a predetermined amount of grease can be injected into the system, of which a correct amount is retained at each bearing inclosure. The horizontal line 40, FIGURE 2, indicates the grease overflow level, and it is to be particularly noted that the lower portion of the bearing always extends below this level.

None of which changes when greater number of rolls or bearings at each roll are involved, for instance, with a troughing idler having five or six rolls, the number of plugs within the prime lubricant passage would then be four in place of the two heretofore mentioned, also the number of transverse passages through the wall of the shaft would increase accordingly.

Figures 6, 7:
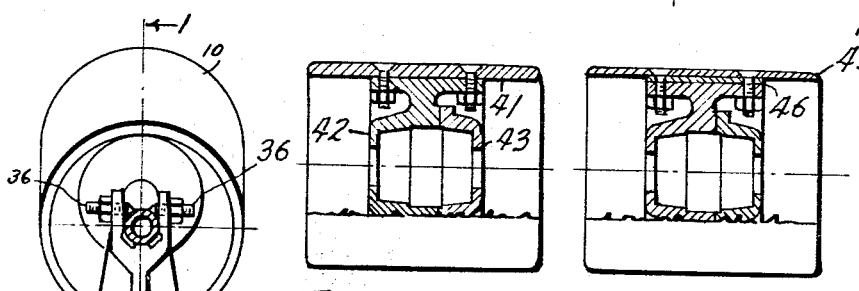
FIGURE 6 is a side view partly in section of a modified roll design, apart from the unishaft troughing idler and the anti-friction bearing system.
FIGURE 7 is another side view partly in section similar to that of FIGURE 6, but of a differently modified roll design.

The FIGURES 6 and 7 show modifications pertaining to the construction of the rolls, in that both entail a separate hub construction from that of the cylindrical portion 41. Re-FIGURE 6, the hub is of two parts 42 and 43 as heretofore described, with the exception that it includes a cylindrical rim 44 of cast section adapted to be bolted onto the circular rim 41 as indicated.

The FIGURE 7 is simular to that of the FIGURE 6, with the exception that the circular shell 45 is a piece of steel tubing and 46 being a series of shims or the like to make up the difference between the thickness of the above cast section 41 and the steel tubing 45.

Figure 8:
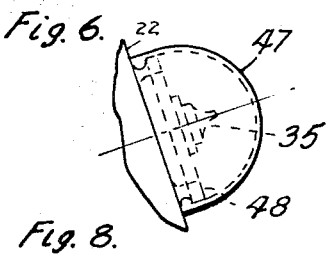
FIGURE 8 is a fragmentary side view at the upper end of an inclined roll hub, showing an optional inclusion of a rubber boot to weather proof the bearing enclosure.

The FIGURE 8 shows a method of inclosing the fitting 35 and the shaft end at the upper portion of the inclined rolls by an elastic rubber boot 47. This rubber boot is of semi-spherical form having internally a bead which snap fit into a groove cast into a circular rim at the upper end of the roll hub 22. The boot 47 having a slit cut through its wall opposite the grease fitting to provide of the application of a grease gun when performing a greasing cycle.

Various changes may be made in the embodiment of the invention hereinabove specifically described without departing from or sacrificing the advantages of the invention as defined in the appended claims.

I claim:
1. In a troughing idler for troughed belt conveyors,
a rigid tubular shaft,
a straight portion of the tubular shaft extending substantially horizontal,
at least two straight portions of said tubular shaft bent to extend longitudinally at an angle to sadi corresponding horizontal portion substantially in the shape of a trough,
a spaced series of anti-friction bearings mounted on said straight portions,
a spaced series of rolls supported on the respective anti-friction bearings, the surfaces of the rolls being parallel with the axes of the respective tubular shaft portions, thereby to form a trough shape support for the conveyor belt,
a base,
spaced brackets extending from the base, under at least two of said bent tubular shaft portions, for supporting said tubular shaft in a trough forming position,
a pair of parallel spaced walls formed on the top of each bracket defining a slot between said walls,
each slot being of sufficient depth to confine and support said tubular shaft,
said tubular shaft having transverse lubricant passages through its wall communicating with said anti-friction bearings,
a plug in said tubular shaft between said spaced lubricant passages at least at the anti-friction bearings adjacent to the respective ends of said tubular shaft for diverting the flow of lubricant from the inside of said tubular shaft into and through the adjacent anti-friction bearing and then through the other spaced passage back into said tubular shaft.

2. In a troughing idler for troughed belt conveyors,
a rigid tubular shaft,
a horizontal straight section,
at least one inclined straight section extending continuously longitudinally from each end of said horizontal straight section,
anti-friction bearing means on each said straight section,
dual series roller elements in each bearing means,
inner and outer races in each bearing means having opposite grooves,
the series of roller elements in each of said dual series being spaced from one another to resist misalignment,
a roll supported on each bearing means,
each roll including a hollow hub with cap means,
said hub and cap means having and inclosing a cylindrical bore fitting over the outer diameter of the outer race of said antifriction bearing means, and having a tapered bore on each side of said cylindrical bore, the larger end of each tapered bore being the adjacent edge of said cylindrical bore and being larger than the diameter of the inner edge of the outer race thereby to provide an annular surface for sealing,
a rotatable seal member in each tapered bore,
the rim portion of each rotatable seal member being tapered to tightly engage the inner circumferential surface of the large end portion of the adjacent tapered bore,
the small end of said rotatable seal member being spaced from the small end of said tapered bore,
said rotatable seal member having a sealed lubricant pocket opened to the adjacent anti-friction bearing means,
the portion of the tubular shaft adjacent the anti-friction bearing means having a pair of passages leading from the inside of the tubular shaft respectively into said lubricant pockets on opposite sides of said anti-friction bearing means,
a plug in said tubular shaft adjacent the anti-friction bearings means of at least the roll adjacent each end of said tubular shaft,
said plug being between the passages of the pair of passages adjacent the respective anti-friction bearing means, thereby to direct lubricant into and through the adjacent bearing means.

References Cited
UNITED STATES PATENTS

| | | | |
|---|---|---|---|
| 1,837,480 | 12/1931 | Philips | 308—187.1 |
| 1,958,412 | 5/1934 | Andrada et al. | 308—187.1 |
| 2,867,481 | 1/1959 | Hornbostel | 308—187 |
| 3,239,285 | 3/1966 | Maderia et al. | 308—187 |

FOREIGN PATENTS

| | | |
|---|---|---|
| 650,923 | 10/1937 | Germany. |
| 860,023 | 12/1952 | Germany. |
| 324,804 | 2/1930 | Great Britain. |
| 1,122,820 | 5/1956 | France. |

MARTIN P. SCHWADRON, *Primary Examiner.*

DAVID J. WILLIAMOWSKY, *Examiner.*

N. ABRAMS, R. F. HESS, G. N. BAUM,
*Assistant Examiners.*